United States Patent [19]

Senour

[11] 3,993,166

[45] Nov. 23, 1976

[54] OVERLOAD SIGNALLING SYSTEM FOR FORK LIFT TRUCKS AND THE LIKE

[75] Inventor: Donald A. Senour, Carlisle, Mass.

[73] Assignee: Bofors America, Inc., Linden, N.J.

[22] Filed: Apr. 29, 1975

[21] Appl. No.: 572,715

[52] U.S. Cl. .............................. 187/9 R; 214/674; 340/267 C
[51] Int. Cl.² .......................................... B66B 9/20
[58] Field of Search .................. 214/1 R, 670–674; 340/267 C, 272; 187/9 R; 212/39

[56] References Cited
UNITED STATES PATENTS

| | | | |
|---|---|---|---|
| 3,710,368 | 1/1973 | Hamilton | 212/39 A |
| 3,724,679 | 4/1973 | Brownell et al. | 212/39 R |
| 3,833,932 | 9/1974 | Hamilton | 340/267 C |
| 3,850,323 | 11/1974 | Ekstrom | 214/674 |
| 3,913,081 | 11/1975 | Hamilton | 340/267 C |

*Primary Examiner*—L. J. Paperner
*Assistant Examiner*—Lawrence J. Oresky
*Attorney, Agent, or Firm*—James E. Mrose

[57] ABSTRACT

An electrical alarm system, which responds to improper and/or unsafe loading of a fork-lift truck or other load-sustaining apparatus equipped with a suitable sensing transducer, is controlled by a high-gain electronic differential switch whose comparisons of reference and sensing-transducer electrical signals are uniquely improved by a combination of: (a) unidirectionally-positive feedback which produces a dynamic transient hysteresis effect; (b) steady-state feedback or hysteresis which prevents false triggering of the system by ambient noise and vibration; (c) a regulator and electrical interference suppression network; and (d) low-level high-frequency partial filtering of oscillations in the waveform of sensing-transducer output signals. Fail-safe system operation is assured by network connections and output actuations which prevent the handling of loads when system cabling is disabled, as well as when overloading is sensed.

6 Claims, 3 Drawing Figures

U.S. Patent          Nov. 23, 1976          3,993,166
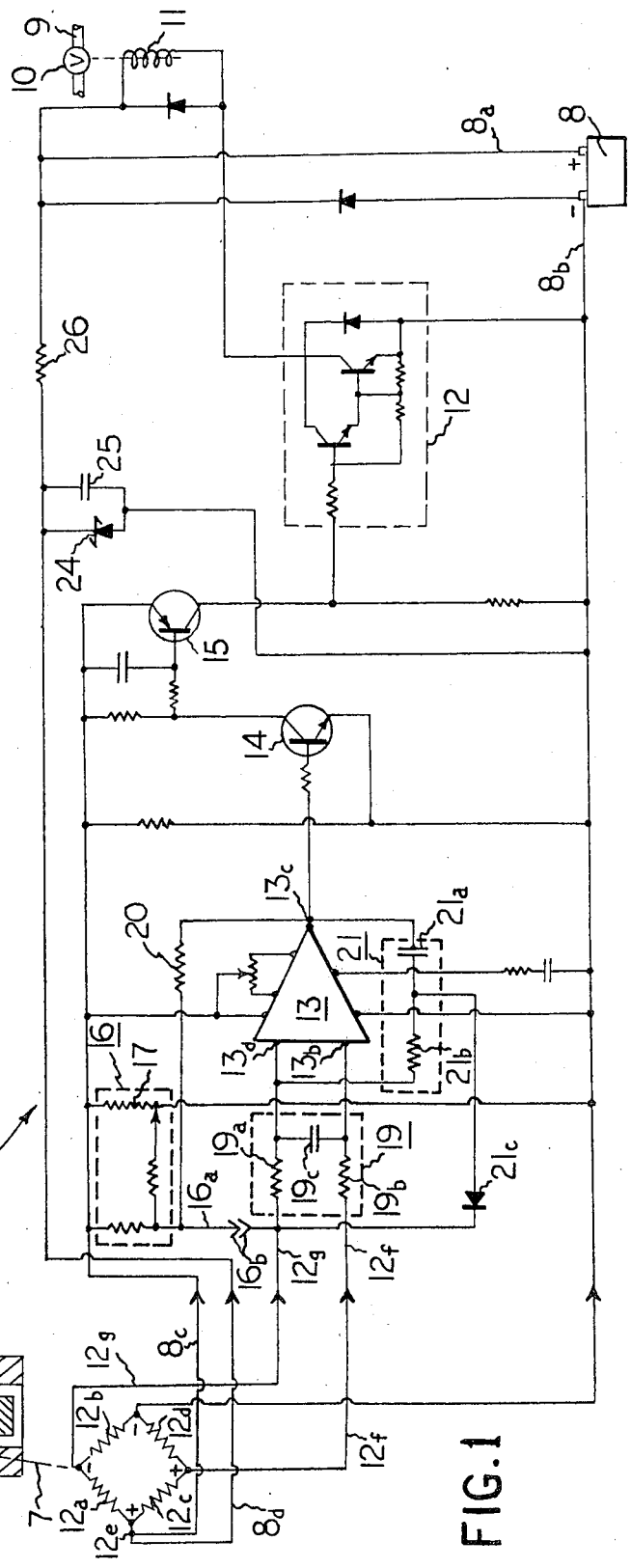
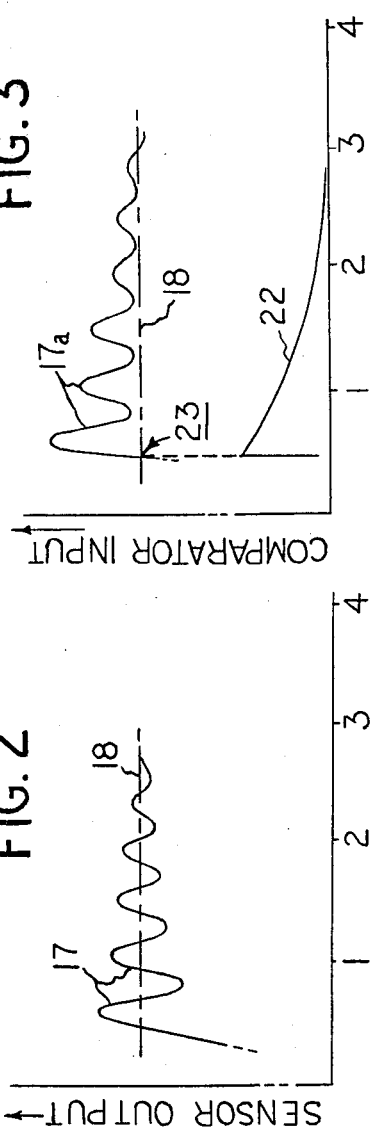
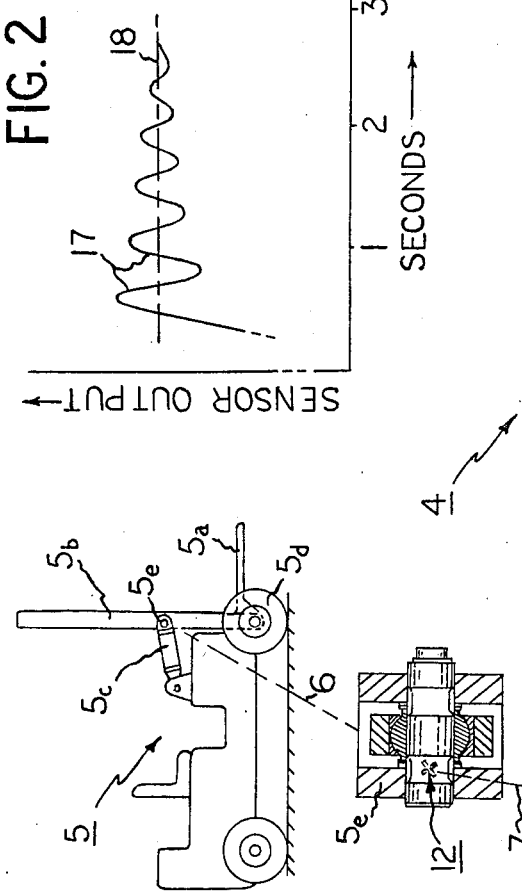

OVERLOAD SIGNALLING SYSTEM FOR FORK LIFT TRUCKS AND THE LIKE

BACKGROUND OF THE INVENTION

The present invention relates to improvements in apparatus which automatically produces an alarm and/or prevents the hazardous handling of unsafe loads when overload conditions are detected by a load-responsive sensor aboard a fork-lift truck or like load-handling equipment, and, in one particular aspect, to such automatic apparatus which is substantially fail-safe and wherein associated electronic control circuitry uniquely overcomes a combination of operating defects, including: oscillations in the support of loads of near-critical level, wastefully-protracted and troublesome disabling of the load-handling equipment following occurrence of transient minor overloads, inability to sense serious overloads soon after another overloading has taken place, and false disabling of the equipment by ambient electrical interference signals.

It has been well known heretofore that excessive levels of mechanical loading of various kinds of equipment could be detected by sensors or transducers disposed at locations where they will continuously respond to at least part of the loading being experienced. One such transducer has functioned as a force pin in the clevis of a lift cylinder of a forklift truck, the pin being equipped with electrical-resistance strain gages which yield electrical signals characterizing the loads being lifted. In another arrangement, described in U.S. Pat. No. 3,570,696, a pivot pin similarly situated is used to actuate a microswitch for the signalling of lifttruck overloads. It has also been proposed, in U.S. Pat. No. 3,866,200, that excessive loading in a hoisting rig be detected via a load cell, with an output being triggered electronically when a load-characterizing signal exceeds a reference load-limit signal.

Accordingly, it is not conceptually broadly novel to sense and warn of overload conditions by electrically characterizing the loading condition of load-handling equipment and detecting when that condition exceeds a predetermined safe level. However, in practice, such a basically simple scheme is found to lack important capabilities of resolving serious problems arising out of the manner in which such load-handling equipment is actually used. In the case of a fork-lift truck attempting to handle a near-critical load, for example, the dynamics of the truck and its operation can cause the load sensor to deliver an electrical output which will oscillate with excursions above and below a preset reference level for maximum safe loading; at the same time, this involves alternate application and cut-off of load-handling power in response to the varying sensor outputs, with the result that the equipment is unstable and rendered useless and is possibly a hazard so long as the oscillations persist. If the system is then purposely made quite sluggish in operation, in an effort to avoid oscillation problems, the resulting slow responses can then admit of limited, but nevertheless dangerous, handlings of excessive loads. Further, momentary rough handling of high but safe loads can cause the system to disable the truck power, and, if one were merely to introduce a time lag to prevent such disabling on that account, then excessive loads would wrongly appear to be safe for at least a short time sufficient to admit of an accident. Moreover, ambient electromagnetic interference signals, which are prevalent in the common environments of use of industrial equipment, and including alternator noise in the case of trucks, are highly likely to cause false operations of sensitive electronic circuitry which may be used in an effort to achieve overload control. Still further, any such control system must lend itself to operations which are essentially fail-safe, and must be substantially tamper-proof in respect of efforts of impatient, or careless operators to eliminate its effects.

SUMMARY OF THE INVENTION

The present invention is aimed at creating improved apparatus in which effects of a combination of peculiar practical operating conditions adversely affecting automatic overload warning and disabling systems for load-handling equipment are taken into account and prevented from impairing the precise and swift controls needed to minimize hazards reliably while at the same time avoiding unnecessary delays in operation of the controlled equipment. In a preferred system embodiment, a suitably-located sensor equipped with strain gages responds to the instantaneous loading conditions being experienced by the hydraulically-powered lifting elements of a fork-lift truck, and delivers related electrical output signals to an on-board electronic network which compares those signals with a reference electrical signal to determine whether the loading is at any instant in excess of a predetermined maximum design level. If not, the network at once disables at least one critical hydraulic power-feed line of the truck, so that the load cannot be lifted; that disabling is effected by withdrawing excitation from a "fail-safe" solenoid-actuated valve which is spring-loaded to close unless electrically energized. The needed comparisons between sensor and reference signals are performed via an operational amplifier used as a high-gain differential switch and incorporating two auxiliary provisions for feedback which introduce special hysteresis effects of steady-state, or DC, and unidirectionally-variable, or positive AC, types. Oscillatory tendencies, which are serious when the mechanical loading is at or near the permitted maximum are in part counteracted by a relatively small amount of electrical filtering of the sensor output signals prior to their application to the comparator, although that filtering is mainly of relatively high-frequency transients and is purposely kept below what would be involved in smoothing out loading-induced cyclings of the sensor signals altogether. Further suppression of the oscillation, as well as isolation from certain truck vibration and noise effects which combine with those of loading, is provided by the aforementioned steady-state feedback, although that is intentionally set at a relatively low amount, such as about 5%. By way of distinction, the aforementioned variable or AC feedback and dynamic hysteresis is caused to be approximately 50%, and to have a time constant of about five seconds, whereby any transient apparent overload sensing, such as that induced by rough handling of a safe load, causes the system to become disabled immediately but then to resume an operative status after about five seconds. Importantly, however, that dynamic hysteresis is made unidirectional, such that any sudden or transient apparent lessening of an unsafe load cannot falsely and hazardously sustain an operative load-handling condition for even that short time. Electromagnetic interference effects are collaterally suppressed by voltage regulator and decoupling provisions, and tamper-proofing is promoted by exciting the fail-safe control network through the cabling which first serves to excite the sensor and therefore cannot be disconnected without also disabling the load-handling capability of the truck.

Accordingly, it is one of the objects of the present invention to provide a novel and improved system, for overload warning and control of load-handling equipment, in which fail-safe assurances, suppression of oscillations, isolation from ambient interference effects, and time-saving recoveries from disabling controls, are developed by way of unique electronic control circuiting incorporating steady-state and unidirectionally-variable feedbacks in association with regulation and filtering.

A further object is to provide novel and advantageous control and/or signalling of overloading conditions for equipment in which a strain-gage transducer senses loads and apparent loads, with automatic corrections and safeguards being developed by wholly electrical and electronic means.

Still further, it is an object to provide an automatic electrical control system arrangement, of relatively uncomplicated and low-cost fail-safe form, which reliably responds to and signals overload conditions aboard a fork-lift truck or the like, while uniquely isolating its control from effects of transient and oscillatory and environmentally-induced components of load-responsive measurements.

BRIEF DESCRIPTION OF THE DRAWINGS

Although those aspects of this invention which are considered to be novel are expressed in the appended claims, further details as to preferred practices and as to further objects and features thereof may be most readily comprehended through reference to the following detailed desription when taken in connection with the accompanying drawings, wherein:

FIG. 1 provides a schematic system diagram of an improved overload control apparatus, together with a pictorially-represented fork-lift truck with which it is in an on-board relationship, and together with a cross-sectioned illustration of a strain-gage transducer such as is installed aboard the truck and delivers load-related signals to the system:

FIG. 2 graphically portrays output signals such as may be developed by the transducer serving the system appearing in FIG. 1; and FIG. 3 graphically portrays electrical signals such as may be impressed upon the input of the electronic comparator appearing in the system of FIG. 1.

DETAILED DESCRIPTION OF THE PREFERRED EMBODIMENTS

Having reference to the drawings, and, more particularly, to FIG. 1 thereof, one embodiment of an electrical overload signalling apparatus 4 is there shown in an on-board association with load-bearing equipment in the form of a fork-lift truck 5, that association being symbolized by dashed linework 6 and 7. Such trucks handle loads by way of forward tines and uprights, 5a and 5b, maneuvered by hydraulically-actuated piston-cylinder units, such as the tilt-adjusting unit 5c. Motive power for travel of the truck is commonly provided by an internal-combustion engine or equivalent prime mover, for which there is an accessory storage battery 8 serving also as a convenient source of electrical power for the electrical apparatus 4. Hydraulic fluid, circulated under pressure by a pump driven by the prime mover, is delivered to the load-handling piston-cylinder units through at least one feed line such as 9, under control of appropriate valving. For present purposes, however, it is important to note that hydraulic line 9 also includes a special normally-closed solenoid valve 10 which is spring-biased toward closure according to a known practice, but which may be maintained open so long as its solenoid winding 11 is kept energized by battery 8 under control of a known form of transistorized power amplifier 12.

Although the arrangement may differ in other instances, in obvious ways, the selected example of overload sensing in the illustrated case of truck 5 involves measurement of restraining forces experienced by one or more of the tilting piston-cylinder units 5c, it having been established that such forces provide a substantially direct indication of the critical overturning moment on the fork-lift front wheels 5d. Excessive loading, beyond a predetermined maximum for a given design of truck, poses self-evident overturning hazards, and must therefore be continuously monitored and its attempted handling must be halted before damage can result. In that connection, the related restraining forces as aforesaid are monitored instead, by way of a strain-gage transducer preferably built integrally into a mounting bracket or clevis 5e associated with an end of piston-cylinder unit 5c, the transducer or sensor being in the known form of a pin 5f between ends of the clevis yoke and equipped with strain gages $12a - 12d$ at one or more conventional sites, such as 12, where their responses to shear-related deformations will accurately characterize these forces.

Battery 8 will normally be somewhat remote from the electrical control circuitry, and the latter will in turn necessarily be remote from the transducer. Impatient or careless operators who might attempt to override the protective effects of the control circuiting cannot do so by simply disconnecting battery cables 8a and 8b, because the solenoid valve 10 will then close under its spring bias and thereby render the load-powering mechanism inoperative. If the cabling to the remote strain-gage transducer bridge involving gages $12a - 12d$ were disconnected, one would normally expect that the control circuitry would behave as though no load were being sensed, and that an override of automatic control would result; however, to block that hazardous possibility, the power cabling 8c which applies a positive connection form battery 8 to the control circuitry is purposely tapped to the battery at the remote site, 12e, of the positive connection to the transducer bridge which is made from the battery via lead 8d. The positive power connection leads $8c - 8d$ and a negative common power connection lead 8b, as well as positive and negative transducer output connection leads 12f and 12g, are of course bundled together as a single cable over the separation distance between the transducer and control circuitry, such that disconnection of the cable at either or both ends will cause the hydraulic powering to be halted at once, in the manner described.

A principal component of the control circuitry is a conventional form of operational amplifier, 13, used as a high-gain differential switch and serving as a comparator. When the net or difference signals applied to the comparator input terminals 13a and 13b are of one polarity, comparator 13 maintains a polarity of output signal, such as negative, at its output terminal 13c, which will cause the known forms of transistor stages 14 and 15 following it to excite power stage 12 so that the latter will in turn appropriately energize the solenoid winding 11 to hold the control valve open; this is the normal operating condition, wherein the sensed loading is within allowable limits and the truck can handle the loading in a normal fashion.

At times when the net comparator input signals applied between 13a and 13b are of a different polarity from that referred to next above, comparator 13 switches or "triggers" a different polarity of output signal, such as positive, at its output terminal 13c, and this in turn immediately causes the train of transistor stages 14, 15 and 12 to block conduction through solenoid winding 11, whereupon the spring-biased control valve 10 automatically closes itself at once and thereby disables the powered handling of any load in a positive sense. In the latter connection, it should be noted that the powering of loading in a "positive" sense refers to lifting or otherwise taking on more of a load, which could cause the overturning sought to be avoided, and that is prevented by valving 10 in a positive or pressurized hydraulic feed line; however, there is no need for such valving in lines which can reduce the pressure in the piston-cylinder units, and these are purposely left for wholly manual control by the operator, who can therefore lower or otherwise back off on loading which proves to be excessive and potentially troublesome once its movement has been commenced and its further positive powering is then cut off automatically by the control circuitry.

For purposes of the differential control to be exercised by comparator 13, the input it witnesses at its terminals 13a and 13b must represent a difference, positive or negative, between the strain-gage transducer output signals and some reference signal which characterizes the maximum loading condition to be tolerated. The latter reference signal is established by a setpoint network 16, in which part of the supply voltage is adjustably tapped from a dropping resistance 17 and fed to the comparator input in opposing relation to the transducer output signals, via lead 16a and through test connection 16b.

As is shown in FIG. 2, the sensor or strain-gage transducer output to circuitry 4 can undergo oscillations such as the transiently-decaying oscillations characterized by the trace 17, which represents bridge output voltage versus time. Viewed in relation to a voltage level 18, which characterizes a signal developed by setpoint network 16 to establish a maximum or 100% safe loading reference, it will be evident that the net signal may alternately be of one and another polarity, with the result that comparator 13 would be switched alternately and the valve 10 would concomitantly disable and restore operation of the "tight" hydraulic powering of the load, repeatedly. Such oscillations can be induced by rough handling of a near-maximum load, for example, or by truck movements, vibration, or the like, and the effects can tend to become hazardously regenerative under some conditions. These consequences are plainly undesirable, and such minor and short-period oscillations should not be allowed to cause disabling of the load-handling capabilities of the truck and cause needless and wasteful interruptions of its work. In partial compensation thereof, the input to comparator 13 is filtered by network 19, shown as a two-pole filter including the two resistances 19a and 19b and a capacitance 19c. Filter network 19 cannot be allowed simply to produce a full smoothing effect at the frequencies of the expected mechanical oscillations because the attendant effect would be to slow the system responses unduly; for example, fork-lift tines might then be raised a significant distance, with risk of overturning under overload conditions, before the system could be disabled automatically. For such reasons, the filtering is purposely selected to be of relatively high-frequency characteristics and to exhibit low smoothing effects which are significantly below those which would smooth out the mechanical oscillation frequencies (such as about 50:1 below); the results of such "transient spike" filtering are virtual elimination of high-frequency "noise" effects and partial smoothing of the said oscillations. In one practical version of the filter for the fork-lift truck application under discussion, resistances 19a and 19b may each be of about 12,100 ohms and capacitor 19c of about 6.8 microfarads. A significant contribution to isolation of the lower-frequency mechanical-oscillation components of input to the comparator is provided by a further relatively low level of what may be termed "DC hysteresis", and which is developed by feedback via resistance 20, the latter serving to add a fraction of the comparator output signal, from its output terminal 13c, to the reference signal from setpoint network 16, such that the comparator will respond to differences not between the transducer and preset reference signals alone but, instead, to the differences between the transducer signals and a combination of the preset reference signals and a fixed percentage of the comparator output signals. It will be remembered that the latter output signals are switched between two different polarities, rather than being variable in amplitudes, and it therefore follows that the feedback signal is of a substantially fixed value but can either add to the reference signal, when the comparator output goes positive, or substract from it, when the comparator output is switched to negative.

Preferably, the aforementioned "DC hysteresis" is of but a small percentage, such as about 5%, of the preset setpoint reference signal value. When the comparator 13 trips or switches its output due to occurrence of an overload condition, feedback element 20 immediately combines a signal with the reference signal, thereby effectively reducing the total reference signal against which the instantaneous transducer output signal is being compared. Accordingly, if the transducer output signal next tends to oscillate by only a small amount to a level lower than the preset reference signal, its next small oscillatory excursion which would normally tend to fall below that preset level will not however be below the combined preset level and feedback signal but will instead remain high enough in relation to them to prevent the comparator from improperly switching the system back on while the load in fact remains excessive. The afforesaid small hysteresis of about 5% also acts to isolate the system from false triggering by effects of truck noise and vibration.

A serious drawback of exclusive reliance upon a DC hysteresis provision of the aforementioned type, without more, is found in its tendency to cause the system to remain disabled once it has gone into an overload-signalling condition because of a temporary small excursion, such as that induced by rough handling of or bumpy travel with safe load at or near the maximum permissible level. In practice, the disabling lock-in can then only be overcome by removing all or a substantial part of the load; with a fork-lift truck, for example, this requires dropping the load to the floor before system load-powering capability can be restored. To offset such problems, a further type of feedback is provided for combination with the above-described DC hysteresis, the further feedback supplying what may be termed an "AC or dynamic hysteresis". The latter is achieved by a network 21, in which a capacitance 21a in series with a resistance 21b is in a feedback-conveying connection between comparator output terminal 13c and its input terminal 13a. For the system under discussion, a resistance of about 3.3 megohms and a capacitance of about 0.47 microfarad develop a desirable time constant which cause the dynamic feedback signal to the comparator input to assume the form shown by trace 22 in FIG. 3. Such a signal commences at the instant, 23, when the transducer output signal exceeds the permissible overload reference level 18. The transducer output signals are thereby effectively referenced in relation to a combination of a fixed-level reference signal and the transient feedback reference or "AC hysteresis" signal, and as is suggested by the trace 17a in FIG. 3, minor oscillatory signals characterizing apparent loading conditions will not be effective to turn the system on and off repeatedly after an initial excursion signifying possible overloading. Instead, it is not until several seconds (such as up to about five) have passed that normal comparison conditions are restored; then, if the loading is in fact less than of hazardous value, the initially-disabled system will automatically restore itself to an operative status, and otherwise will not. It is not necessary that the load be dropped or otherwise reduced to restore intended operativeness of the system, and the delay of but several seconds does not pose practical difficulty in relation to the alternative discussed. However, the AC hysteresis provision does have an undesirable collateral effect which must be avoided if operating risk is to be minimized. Specifically, it has been established that the transient or dynamic feedback via 21a and 21b can lead to difficulty when it is switched to the polarity opposite to that just described. If an unsafe load is suddenly reduced, by dropping it to the floor, for example, the dynamic hysteresis or feedback would then cause the comparator to see a net input which seems to be within a proper level, for the several seconds involved in the feedback time constant; this would thus allow the operator to handle the unsafe load for a short time while the system fails to disable itself automatically. In eliminating that potential hazard the time constant of network 21 is effectively altered to a very short one during such opposite-polarity feedback periods, by a diode 21c which by-passes resistance 21b, through the much lower resistance 19a in the illustrated circuitry. The resulting delay in exercise of automatic control during such periods is then but a few milliseconds, which is safely shorter than any practical response time of the truck load-handling mechanisms. The AC hysteresis or substantially unidirectional feedback is intentionally made to be of relatively high peak level, such as about 50% of the reference input signal, so that the desired effects are well assured in the system operation.

Electromagnetic interference effects, which are prevalent in the environment of use, particularly as the result of engine alternator usage, can cause false triggering of the improved system nevertheless, unless suppressed, and for like reason the power supply to the system requires regualtion, even though the excitation source is a battery, 8. Zener diode 24 and capacitance 25, in parallel across the supply lines to the network 4 and transducer input terminals, and in series with resistance 26, provide the appropriate supply voltage regulation and decoupling from effects of electomagnetic interference.

In other adaptations of the invention here disclosed, the controlled apparatus may of course be in the form of load-handling equipment other than the fork-lift truck about which the description of a preferred application has been centered; in addition to vehicles, such equipments as rolling mills, presses and the like may similarly be automatically protected from overloading difficulties. Likewise, audible and/or visual alarm signals may be developed via electrical outputs such as those which excite the solenoid winding 11. Although a hydraulic load-powering system and its valving have been specifically described, their electrical and mechanical counterparts may be involved in other equipment, and the associated load-sensing transducer may be of an other-than- illustrated form and may involve elements other than strain gages, with comparable results. Accordingly, in connection with this specification, it should be understood that the specific embodiments and practices herein described have been presented by way of disclosure rather than limitation, and that various modifications, combinations and substitutions may be effected by those skilled in the art without departure in spirit or scope from this invention in its broader aspects and as set forth in the appended claims.

What I claim as new and desire to secure by Letters Patent of the United States is:

1. Automatic equipment for prevention of overloaded operation of load-lifting apparatus, comprising electrically-actuated means for interrupting supply of load-lifting power by said apparatus, said interrupting means being electrically exictable to allow said supply and normally interrupting said supply in the absence of a predetermined electrical excitation, transducer means producing electrical output signals characterizing the extents of loading being lifter by said apparatus, means producing a reference electrical signal characterizing a maximum permissible loading to be lifted by said apparatus, electronic comparator means producing first and second electrical output signals responsive to said output signals of said transducer means which respectively exceed and are less than combined electrical reference signals including said reference electrical signal, regulated electrical power supply means energizing said comparator means and said means producing a reference electrical signal, electrical filter means interposed between said transducer means and said comparator means and smoothing out components of signals admixed with said output signals of said transducer means which are high in frequency relative to expected frequencies of oscillations of loading of said apparatus sensed by said transducer means, DC feedback means supplying from said first and second signals and as one of the signals of said combined reference signals a signal which is but a relatively small percentage of the value of said reference signal, unidirectional AC feed-back means supplying from said first signal and as one of the signals of said combined reference signals a signal which decays to substantially zero from a relatively high percentage of the value of said reference signal in several seconds following each occurrence of said first signal and which supplies only an insignificantly short signal from said second signal as one of the signals of said combined reference signals following each occurrence of said second signal, and means responsive only to said first signals from said comparator means withholding said predertermined electrical excitation from said interrupting means to interrupt said supply of load-lifting power and thereby disabling said apparatus during each occurrence of one of said first signals, whereby mechanical and electromagnetic noise and mechanical oscillations falsely simulating overloading of said apparatus are automatically counteracted in tendencies to falsely disable said apparatus for more than several seconds and said apparatus tends to fail safe upon occurrence of a malfunction.

2. Automatic equipment for prevention of overloaded operation of load-lifting apparatus as set forth in claim 1, wherein said transducer means includes a strain gage network the input excitation of which is provided by said regulated electrical power supply means, wherein said comparator means comprises a high-gain differential electronic switch, wherein said relatively small percentage is of the order of about five percent and wherein said relatively high percentage is of the order of about fifty percent, wherein said several seconds are of the order of about five, and wherein said unidirectional AC feedback means includes resistance and capacitance coupling said signal decaying from said high percentage between the output and input of said comparator and a diode and second and smaller resistance and said capacitance between said output and input which render the feedback signal insignificantly short in response to said second signal.

3. Automatic equipment for prevention of overloaded operation of a fork-lift truck or like apparatus, comprising fail-safe electrically-actuated means for interrupting supply of mechanical load-handling power by said apparatus, said interrupting means being electrically excitable to allow said supply and normally interrupting said supply of load-handling power in the absence of a predetermined electrical exictation thereof, at least one strain-gage transducer responding to effects of mechanical loads handled by said apparatus for producing electrical output signals characterizing the extents of mechanical loading being handled by said apparatus, a regulated electrical power supply, electrical setpoint-signal means energized by said power supply and adjustable to produce a reference electrical signal characterizing a maximum permissible mechanical loading to be handled by said apparatus, comparator means in the form of an electronic differential switch producing first and second electrical output signals responsive to output signals from said strain-gage transducer which respectively exceed and are less than combined electrical reference signals including said reference signal, means energizing said comparator means and said strain-gage transducer from said regulated power supply, filtering means isolating said comparator means from frequencies of signals which are high in relation to expected frequencies of oscillations of mechanical oscillations of loading being handled by said apparatus, DC hysteresis means supplying feedback directly related to said first and second signals as one of the signals of said combined reference signals, said feedback being but a relatively small percentage of the value of said reference signal, AC hysteresis means supplying from said first signal and as one of the signals of said combined reference signals a feedback which decays to substantially zero from a relatively high percentage of the value of said reference signal in several seconds following occurrence of said first signal and which supplies only an insignificantly short signal as feedback from said second signal and as one of the signals of said combined reference signals following each occurrence of said second signal, and means responsive to said second signals for applying said predetermined electrical excitation to said interrupting means only so long as each of said second signals persists, whereby mechanical and electromagnetic noise and mechanical oscillations falsely simulating overloading of said apparatus are automatically counteracted in tendencies to falsely disable said apparatus for more than several seconds.

4. Automatic equipment as set forth in claim 3 wherein said interrupting means comprises a solenoid-actuated valve which is physically biased normally closed in the absence of said predetermined electrical excitation thereof and which is interposed in a pressurized hydraulic feed line which delivers load-handling power in said apparatus, wherein said power supply derives electrical energy from a battery aboard said apparatus, wherein said strain-gage transducer is remote from said battery and comparator means and setpoint-signal means and hysteresis means and excitation-applying means aboard said apparatus, and wherein regulated electrical power from said power supply is applied via cabling which applies it first to said remote strain-gage transducer and thence to said comparator means and to other means energized by said power supply.

5. Automatic equipment as set forth in claim 4 wherein said filtering means includes an electrical filter interposed between the output of said strain-gage transducer and the input to said comparator means and smoothing out components of signals admixed with output signals of said transducer which are high in frequency relative to said expected frequencies, the filtering by said filter being of the order of about 50 to 1 below what would be effective to smooth out the said expected frequencies of said mechanical oscillations, and wherein said relatively small percentage is of the order of about five percent, and wherein said relatively high percentage is of the order of about fifty percent.

6. Automatic equipment as set forth in claim 4 wherein said AC hysteresis means includes capacitance and relatively high resistance coupling said decaying signal between the output and input of said comparator means with a time constant of the order of about five seconds and includes capacitance and a relatively low resistance and a diode polarized to couple said feedback from said second signal between said output and input of said comparator means with a short time constant rendering the feedback insignificantly short.

* * * * *